(12) United States Patent
Song et al.

(10) Patent No.: US 9,067,809 B2
(45) Date of Patent: Jun. 30, 2015

(54) APPARATUS AND METHOD FOR ANAEROBIC WASTEWATER TREATMENT WITH MEMBRANE

(71) Applicant: KOREA INSTITUTE OF SCIENCE AND TECHNOLOGY, Seoul (KR)

(72) Inventors: Kyung Guen Song, Seoul (KR); Jung Yeol Lee, Daegu (KR); Jun Hee Ryu, Seoul (KR); Se Yeon Won, Seongmun-myeon (KR); Min-hyuk Yoon, Ansan-si (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 264 days.

(21) Appl. No.: 13/908,441

(22) Filed: Jun. 3, 2013

(65) Prior Publication Data
US 2014/0124439 A1 May 8, 2014

(30) Foreign Application Priority Data
Nov. 5, 2012 (KR) .................... 10-2012-0124091

(51) Int. Cl.
  C02F 3/28 (2006.01)
(52) U.S. Cl.
  CPC ............. *C02F 3/2853* (2013.01); *C02F 3/2846* (2013.01); *C02F 3/286* (2013.01); CPC . *Y02E 50/343* (2013.01); *C02F 3/2833* (2013.01); *C02F 3/284* (2013.01); *C02F 3/2866* (2013.01); *C02F 2201/46135* (2013.01); *C02F 2209/42* (2013.01)
(58) Field of Classification Search
  CPC ...... C02F 3/2853; C02F 3/2846; C02F 3/286; C02F 3/2833; C02F 3/284; C02F 3/2866; C02F 2201/46135; C02F 2209/42; Y02E 50/343

USPC .......................... 210/603, 615, 616, 617, 259
See application file for complete search history.

(56) References Cited

U.S. PATENT DOCUMENTS

| 4,211,647 A * | 7/1980 | Friedman et al. ............. 210/603 |
| 4,936,996 A * | 6/1990 | Messing ........................ 210/603 |
| 2010/0264079 A1* | 10/2010 | Begin et al. .................. 210/603 |

FOREIGN PATENT DOCUMENTS

| DE | 19928663 A1 * | 12/2000 |
| KR | 10-2000-0003714 | 1/2000 |

(Continued)

OTHER PUBLICATIONS

K. H. Ahn et al., "Performance comparison of direct membrane separation and membrane bioreactor for domestic wastewater treatment and water reuse," *Water Science & Technology-Water Supply*, vol. 1, No. 5-6, 2001, pp. 315-323.

*Primary Examiner* — Fred Prince
(74) *Attorney, Agent, or Firm* — Goldilocks Zone IP Law (57) ABSTRACT

The present disclosure relates to an apparatus and method for anaerobic wastewater treatment with a membrane, which effectively generates biogas and suppresses fouling on a membrane surface by performing anaerobic treatment to wastewater. The apparatus for anaerobic wastewater treatment with a membrane includes: an anaerobic reactor for performing anaerobic treatment to wastewater and generating biogas; an anaerobic membrane bio-reactor for filtering wastewater discharged from the anaerobic reactor by means of a membrane module and providing an additional anaerobic treatment space for the wastewater; submerged membrane modules provided in the anaerobic membrane bio-reactor to filter wastewater; rotating disks provided at both sides of the submerged membrane module to induce turbulence to the wastewater by means of rotation; and a second media provided in the anaerobic membrane bio-reactor to circulate according to the flow of the wastewater so that foulants on a surface of the membrane module are detached.

13 Claims, 4 Drawing Sheets

(56) References Cited

FOREIGN PATENT DOCUMENTS

| KR | 10-2000-0065883 | 11/2000 |
| KR | 10-0315968 | 12/2001 |
| KR | 2002-0089255 | 11/2002 |
| KR | 10-2003-0039038 | 5/2003 |
| KR | 10-2007-0075947 | 7/2007 |
| KR | 10-0828742 | 5/2008 |
| KR | 10-2012-0062881 | 6/2012 |
| KR | 10-2012-0114781 | 10/2012 |

* cited by examiner

APPARATUS AND METHOD FOR ANAEROBIC WASTEWATER TREATMENT WITH MEMBRANE

CROSS-REFERENCE TO RELATED APPLICATION

This application claims priority to Korean Patent Application No. 10-2012-124091, filed on Nov. 5, 2012, and all the benefits accruing therefrom under 35 U.S.C. §119, the contents of which in its entirety are herein incorporated by reference.

BACKGROUND

1. Field

The present disclosure relates to an apparatus and method for anaerobic wastewater treatment with a membrane, and more particularly, to an apparatus and method for anaerobic wastewater treatment with a membrane, which effectively generates biogas and suppresses fouling on a membrane surface by performing anaerobic treatment to wastewater and also efficiently performs biological treatment and membrane separation simultaneously under an optimal condition.

2. Description of the Related Art

Recently, a membrane bioreactor (MBR) is frequently applied in sewage and wastewater treatment. The membrane bioreactor treats wastewater with high efficiency by applying a membrane to a biological treatment process represented by an activated sludge, and the microorganism concentration in the reactor may be maintained high regardless of the sludge settleability. Therefore, the membrane bioreactor may have a compact design, allow high organic loading, and give high effluent quality. In particular, due to the compact design and advantageous energy efficiency, a submerged-type membrane bioreactor configured to directly immerse membranes in an aeration tank and suck out treated water is frequently applied. This method is disclosed in Korean Patent Registration No. 315968, Korean Unexamined Patent Publication Nos. 2000-0065883, 2000-0003714, 2002-0089255, 2003-0039038 or the like.

If such a submerged-type membrane bioreactor is applied, the membrane is inevitably clogged due to the foulant on a membrane surface. In order to prevent this phenomenon, turbulence is formed by means of aeration. However, in this case, the amount of aeration required for the biological treatment is much greater than the amount of air required, which results in excessive energy consumption and high maintenance costs.

In order to remedy the above shortcomings, in a paper <K. H. Ahn, K. G. Song, I. T. Yeom, K. Y. Park, (2001). "Performance comparison of direct membrane separation and membrane bioreactor for domestic wastewater treatment and water reuse," *Water Science & Technology: Water Supply*, 1 (5-6), 315-323> and Korean Unexamined Patent Publication No. 2007-0075947, a membrane module equipped with a rotating disk or propeller is used to suppress the clogging of the membrane. However, in this method, in order to suppress the clogging of a membrane, it is needed to accelerate the rotation of the rotating disk or propeller to form turbulence effectively. Therefore, energy consumption is still required for rotating the rotating disk or propeller.

Meanwhile, the biological treatment of wastewater generally uses aerobic treatment which needs to supply oxygen, but the aerobic treatment consumes a lot of energy to supply oxygen. In comparison, the anaerobic treatment does not need to supply oxygen and produces available renewable energy by generating biogas. However, for the anaerobic treatment, it is important that anaerobes growing relatively slowly are maintained at a high concentration in a reactor. This may be solved by providing attached growth media where the anaerobes may be attached and grow and simultaneously using a membrane bioreactor. Therefore, Korean Patent Application No. 2012-0114781 proposes an efficient anaerobic membrane bioreactor which combines advantages of the anaerobic treatment and advantages of the attached growth media and the membrane bioreactor.

Since the basic condition of the anaerobic membrane bioreactor is the use of anaerobes, the anaerobic condition must be maintained. Therefore, perfectly blocking an external air is one of important factors, when determining the efficiency of the anaerobic treatment. However, in case of an anaerobic membrane bioreactor disclosed in Korean Patent Application No. 2012-0114781, a bioreactor taking charge of biological treatment and a membrane for separating treated water are combined with a single reactor. When exchanging or repairing parts of the membrane due to malfunction or the like, the reactor should be opened and contact the external air. Therefore, it is impossible to maintain perfect blockage from the external air, which may become a serious obstruction to the anaerobic treatment. In addition, in this case, operating conditions for biological treatment and membrane separation should be harmonized. However, if operating conditions such as residence times for efficient operation are different from each other, the biological treatment efficiency or the membrane separation efficiency may deteriorate. Therefore, it may be impossible to ensure efficient operation due to such a disharmonized state.

RELATED LITERATURES

Patent Literature (Patent Literature 1) Korean Patent Registration No. 315968
(Patent Literature 2) Korean Unexamined Patent Publication No. 2000-0065883
(Patent Literature 3) Korean Unexamined Patent Publication No. 2000-0003714
(Patent Literature 4) Korean Unexamined Patent Publication No. 2002-0089255
(Patent Literature 5) Korean Unexamined Patent Publication No. 2003-0039038
(Patent Literature 6) Korean Unexamined Patent Publication No. 2007-0075947
(Patent Literature 7) Korean Patent Application No. 2012-0114781

Non-Patent Literature (Non-patent Literature 1)<K. H. Ahn, K. G. Song, I. T. Yeom, K. Y. Park, (2001). "Performance comparison of direct membrane separation and membrane bioreactor for domestic wastewater treatment and water reuse," Water Science & Technology: Water Supply, 1 (5-6), 315-323>

SUMMARY

The present disclosure is directed to providing an apparatus and method for anaerobic wastewater treatment with a membrane, which may generate biogas and suppress fouling on a membrane surface by performing anaerobic treatment to wastewater and simultaneously perform biological treatment and membrane separation under an optimal condition.

In one aspect, there is provided an apparatus for anaerobic wastewater treatment with a membrane, which includes: an anaerobic reactor for performing anaerobic treatment to wastewater and generating biogas; an anaerobic membrane bio-reactor for filtering wastewater discharged from the anaerobic reactor by means of a membrane module and providing an additional anaerobic treatment space for the wastewater; an submerged membrane module provided in the anaerobic membrane bio-reactor to filter wastewater; rotating disks provided at both sides of the submerged membrane module to induce turbulence to the wastewater by means of rotation; and a second media provided in the anaerobic membrane bioreactor to circulate according to the flow of the wastewater so that foulants on a surface of the membrane module are detached.

A plurality of first media may be provided in the anaerobic reactor, and anaerobes may be attached to surfaces of the first media and the second media. In addition, the anaerobic reactor may be operated to make down flow. Moreover, when the anaerobic reactor is operating, wastewater may be circulated so that the volume of the first media is expanded by 20 to 30%.

An anaerobic granular sludge or sludge blanket may be provided in the anaerobic reactor, and the anaerobic reactor may be operated to make up flow. In addition, an anaerobic suspended sludge may be provided in the anaerobic reactor, and a stirrer may be provided in the anaerobic reactor for mixing.

The first media or the second media may be made of organic polymer material with a porous surface, and the media may have a hexahedral or spherical shape made of any one of polyurethane, polypropylene and polyethylene, or have a spherical shape made by uniting fiber bundles made of any one of polyurethane, polypropylene and polyethylene.

A plurality of rotating disks may be provided to be spaced apart from each other, and a membrane module may be provided in a space respectively between the rotating disks.

In another aspect, there is provided a method for anaerobic wastewater treatment with a membrane, which includes: introducing wastewater into an anaerobic reactor provided with anaerobes to perform anaerobic treatment and generate biogas; supplying wastewater discharged from the anaerobic reactor into an anaerobic membrane bio-reactor provided with an submerged membrane module and a second media; and filtering wastewater by the submerged membrane module, and additionally performing anaerobic treatment to the wastewater and generating biogas in the anaerobic membrane bio-reactor, wherein the method further includes a foulant removing operation for rotating rotating disks provided at both sides of the submerged membrane module to make turbulence to the wastewater so that foulants on a surface of the membrane module are removed through the second media, and wherein the foulant removing operation is applied during the filtering of wastewater.

The apparatus and method for anaerobic wastewater treatment with a membrane according to the present disclosure give the following effects.

In comparison to the treatment based on an aerobic condition, energy consumption may be greatly reduced, and additionally biogas may be produced. In addition, by applying a rotating disk and a media, fouling on the surface of submerged membrane module may be effectively decreased. In particular, since the anaerobic reactor where biological treatment is mainly performed and the anaerobic membrane bio-reactor where treated water is mainly filtered are separated from each other, when exchanging or repairing the membrane, it is possible to open and close only the anaerobic membrane bio-reactor. Therefore, the anaerobic reactor where biological treatment is performed may maintain its anaerobic condition. In other words, the anaerobic reactor may perform anaerobic treatment efficiently even though the membrane is exchanged or repaired. Moreover, since operating conditions such as residence time may be optimally managed for each reactor separately, it is possible to operate each reactor suitably for its characteristic, and the overall efficiency may be optimized.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF MAIN ELEMENTS

| | |
|---|---|
| 110: anaerobic reactor | 120: first media |
| 130: baffle | 140: first biogas tank |
| 150: water level sensor | |
| 210: anaerobic membrane bio-reactor | |
| 220: submerged membrane module | |
| 230: rotating disk | 240: second media |
| 250: baffle | 260: second biogas tank |
| 271: motor | 272: shaft |
| 280: water level sensor | |

DETAILED DESCRIPTION

Hereinafter, an apparatus and method for anaerobic wastewater treatment with a membrane according to an embodiment of the present disclosure will be described in detail with reference to the accompanying drawing.

Figure 1:
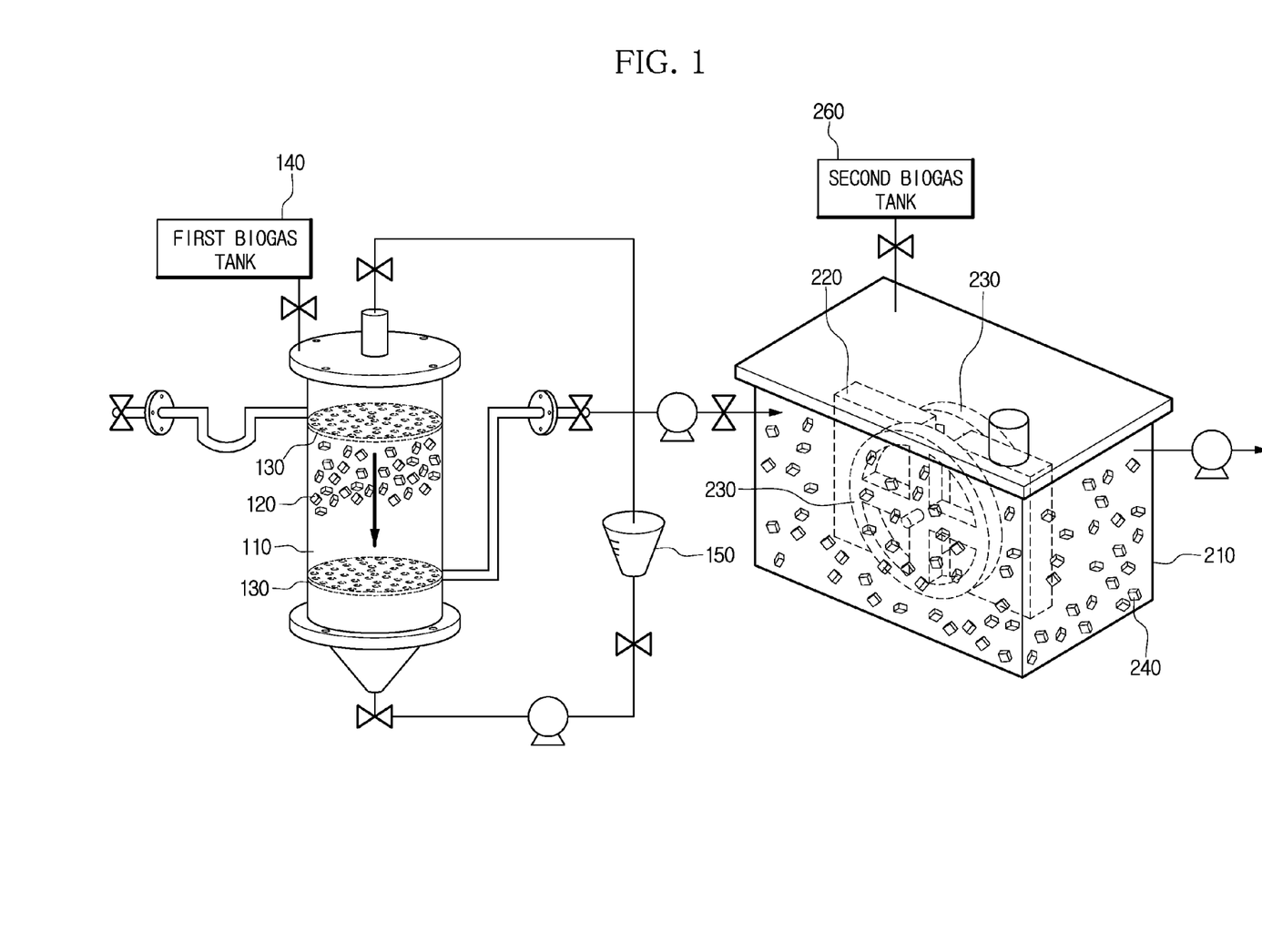
FIG. 1 is a perspective view showing an apparatus for anaerobic wastewater treatment with a membrane according to an embodiment of the present disclosure.

Referring to FIG. 1, the apparatus for anaerobic wastewater treatment with a membrane according to an embodiment of the present disclosure is configured to include an anaerobic reactor 110 and an anaerobic membrane bio-reactor 210.

The anaerobic reactor 110 plays a role of performing anaerobic treatment to wastewater to generate biogas such as methane gas and treat contaminants in the wastewater. In detail, the anaerobic reactor 110 is configured to have a cylindrical shape and operates in an anaerobic state, and the anaerobic reactor 110 includes a plurality of first media 120 therein. In addition, baffles 130 are provided to upper and lower portions of the anaerobic reactor 110 to prevent the first media 120 from separating and induce circulation and expansion through the first media 120. Anaerobes are attached to the surface of the first media 120 so that biogas such as methane gas is produced when anaerobic treatment is performed to the wastewater.

At one side of the upper portion of the anaerobic reactor 110, a biogas pipe (not shown) for exhausting biogas such as methane gas produced by the anaerobes of the first media 120 is provided, and the exhausted biogas passes via the biogas pipe and is stored in a first biogas tank 140. Along with it, a water level sensor 150 for sensing a water level of the anaerobic reactor 110 is provided at one side of the anaerobic reactor 110.

Wastewater is introduced at the upper portion of the anaerobic reactor 110, flows downwards and is discharged through the lower portion of the anaerobic reactor 110. The discharged water of the anaerobic reactor 110 is supplied to an anaerobic membrane bio-reactor 210 described later. In the wastewater introduced to the anaerobic reactor 110, contaminants are removed by means of anaerobic treatment due to the anaerobes attached to and growing at the surface of the first media 120, and simultaneously biogas such as methane gas is produced. When the anaerobic reactor 110 is operated to make down flow, a predetermined pressure may be applied so that the volume of the first media 120 is expanded to a certain level. In this way, the surface area of the first media 120 may be increased, and the activity of anaerobes may be enhanced, which may improve the contaminant treatment efficiency and the biogas production efficiency. The pressure may be applied so that the volume of the first media 120 increases by 20 to 30% in comparison to its initial volume. In addition, the first media 120 may be designed so that 40 to 60% of the first media 120 is charged in comparison to the entire volume of the anaerobic reactor 110.

Meanwhile, the anaerobic reactor 110 may have various configurations. In the above description, the first media 120 to which anaerobes are attached is provided in the anaerobic reactor 110 so that anaerobic treatment may be performed to wastewater. However, it is also possible that a granular sludge or a sludge blanket is provided in the anaerobic reactor 110 to perform anaerobic treatment to wastewater. In case of using the granular sludge or the sludge blanket, wastewater is supplied into the anaerobic reactor 110 as up flow. In addition, an anaerobic suspended sludge may be provided in the anaerobic reactor 110, and in this case, a stirrer is additionally provided in the anaerobic reactor 110.

Figure 2:
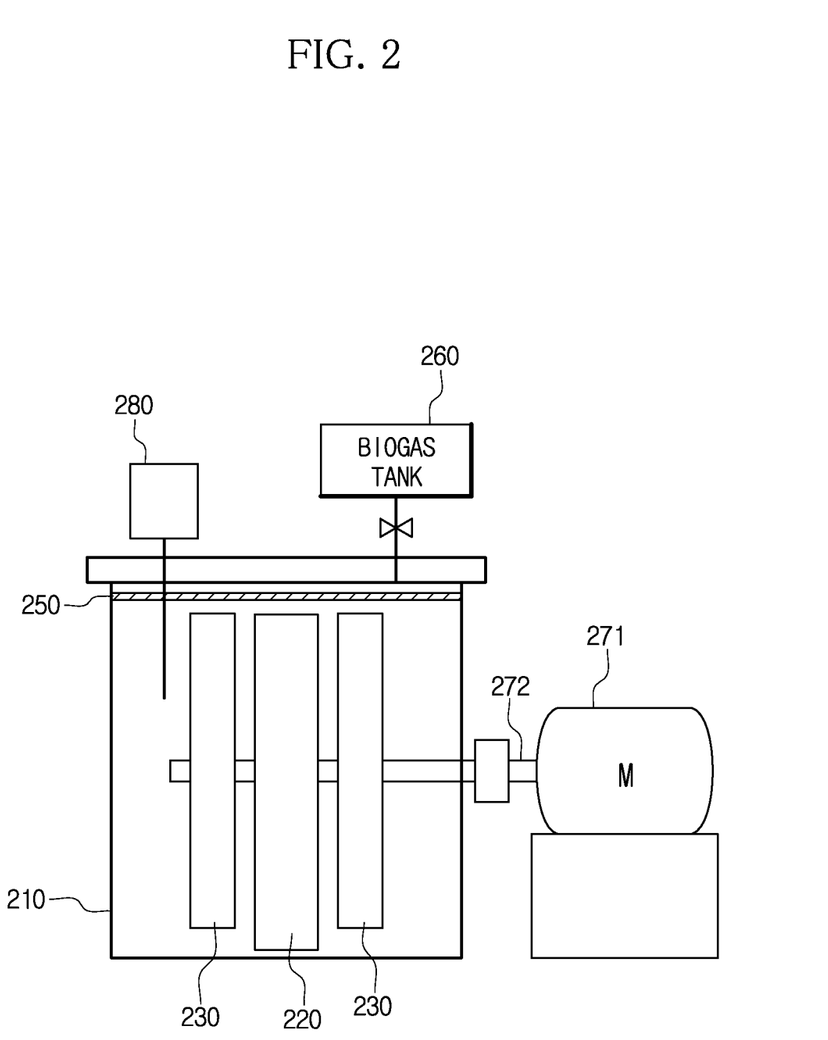
FIG. 2 is a side sectional view showing an anaerobic membrane bio-reactor according to an embodiment of the present disclosure.

The anaerobic membrane bio-reactor 210 plays a role of filtering wastewater by using a membrane module and additionally performing anaerobic treatment to the wastewater to induce production of biogas. In order to maintain the anaerobic state, the anaerobic membrane bio-reactor 210 is isolated from the external circumstance, and an air supply device such as an air diffuser used in an existing MBR is excluded.

A submerged membrane module 220 is included in the anaerobic membrane bio-reactor 210, and the submerged membrane module 220 plays a role of removing total suspended solid (SS) of wastewater. Rotating disks 230 are provided at both sides of the submerged membrane module 220. The rotating disk 230 rotates by a motor 271 connected to one side thereof, and the rotation of the rotating disk 230 induces turbulence to the wastewater, which eventually detaches foulants attached to the surface of the membrane module or restrains adhesion of foulants to the surface of the membrane module. The rotating disk 230 is spaced apart from the surface of the membrane module by a predetermined distance, and two rotating disks 230 provided at both sides of the membrane module are connected to the motor 271 via a shaft 272 so that two rotating disks 230 simultaneously rotate by the driving of the motor 271. As another embodiment, a motor may be connected to each rotating disk so that the rotating disks are driven independently. Meanwhile, the rotating disks 230 may be installed successively to the shaft 272 according to the number of the membrane modules 220 in a state where the membrane modules 220 are interposed between the rotating disks 230. In other words, a plurality of rotating disks 230 may be provided to be spaced apart from each other, and membrane modules 220 may be respectively provided to spaces between the rotating disks 230.

The fouling of the membrane module may be suppressed by the rotation of the rotating disk 230. At this time, a second media 240 may be additionally provided to improve the foulant removing effect of the membrane module. In detail, in a state where a plurality of second media 240 of a predetermined unit size are provided in the anaerobic membrane bio-reactor 210, the turbulent flow generated by the rotation of the rotating disk 230 may make the second media 240 circulate so that foulants are detached by the shaking of the second media 240. In addition, foulants may be detached due to the scour of the second media 240 to the membrane surfaces.

Moreover, the second media 240 is made of porous material, and anaerobes are attached to and grow at the surface and pores of the second media 240, which allows to treat contaminants in the anaerobic membrane bio-reactor 210 and to produce biogas such as methane gas. In particular, since anaerobes on the surface of the second media 240 treat contaminants and the concentration of the anaerobes may be maintained high, the concentration of suspended solids which should be rejected by the membrane module 220 is greatly lowered. Therefore, the fouling of the membrane module 220 may be greatly reduced in comparison to an existing membrane bio-reactor where contaminants are treated by suspended microorganisms.

Along with it, the second media 240 has a porous form so as to serve as a habitat of anaerobes and is made of organic polymer material such as polyurethane, polypropylene, polyethylene or the like, which is a soft material not damaging the membrane when making a friction with the membrane. In addition, the second media 240 may have a hexahedral or spherical shape with a filter diameter of 1 to 20 mm or have a spherical shape made by uniting fiber bundles made of the above material. The above first media 120 may also have the same shape and material as the second media 240.

A baffle 250 is provided at the upper portion of the anaerobic membrane bio-reactor 210 in order to prevent the second media 240 from moving upwards over the top position of the membrane module. In addition, a second biogas tank 260 for storing biogas such as methane gas generated by the anaerobes in the anaerobic membrane bio-reactor 210 is provided at one side of the upper portion of the anaerobic membrane bio-reactor 210. Along with it, a water level sensor 280 for sensing a water level of the anaerobic membrane bio-reactor 210 is provided at one side of the anaerobic membrane bio-reactor 210.

Heretofore, the configuration of the apparatus for anaerobic wastewater treatment with a membrane according to an embodiment of the present disclosure has been described. Next, operations of the apparatus for anaerobic wastewater treatment with a membrane will be described.

If wastewater is introduced to the anaerobic reactor 110, anaerobic treatment is performed to the wastewater and biogas such as methane gas is produced. In detail, since the anaerobic reactor 110 is operated in an anaerobic state, if the wastewater stays in the anaerobic reactor 110 for a certain time, the anaerobes attached to the first media 120 react with the wastewater to decompose organic matter and produce biogas such as methane gas. While the anaerobic treatment process and the biogas production process are executed in the anaerobic reactor 110, the wastewater introduced to the anaerobic reactor 110 flows downwards. In addition, in order to maximize the efficiency for anaerobic treatment and biogas production, the wastewater is circulated so that the volume of the first media 120 is expanded by 20 to 30%.

As described above, the anaerobic reactor 110 may use granular sludge or sludge blanket and may also use anaerobic suspended sludge, without being limited to the first media to which anaerobes are attached.

The discharged water flowing from the anaerobic reactor 110 is supplied to the anaerobic membrane bio-reactor 210. If the discharged water of the anaerobic reactor 110 is supplied to the anaerobic membrane bio-reactor 210, a filtration process is performed by the submerged membrane module 220. The suspended solids in the wastewater is filtered by the submerged membrane module 220. Together with the filtration process, anaerobic treatment is performed to the wastewater in the anaerobic membrane bio-reactor 210. As described above, the anaerobic membrane bio-reactor 210 forms an anaerobic state where air supply is blocked. Therefore, the wastewater stays in the anaerobic membrane bio-reactor 210 for a predetermined time, the reaction between the wastewater and the anaerobes attached to the surface of the second media 240 decomposes organic matter and produces biogas, and the produced biogas is transferred to the biogas tank.

During the filtration process, foulants on the surface of the membrane module are removed. In a state where the anaerobic membrane bio-reactor 210 is filled with the second media 240, the rotating disks 230 provided at both sides of the membrane module are rotated to make turbulence to the wastewater, which removes foulants on the surface of the membrane module. Simultaneously, foulants on the surface of the membrane module are removed through the second media 240. The rotating disk 230 may be rotated while the filtration process is being executed.

Next, the effect of decreasing transmembrane pressure (TMP) by means of the rotation of the rotating disk and the second media, obtained by operating the apparatus for anaerobic wastewater treatment with a membrane according to an embodiment of the present disclosure, will be described.

Figure 3:
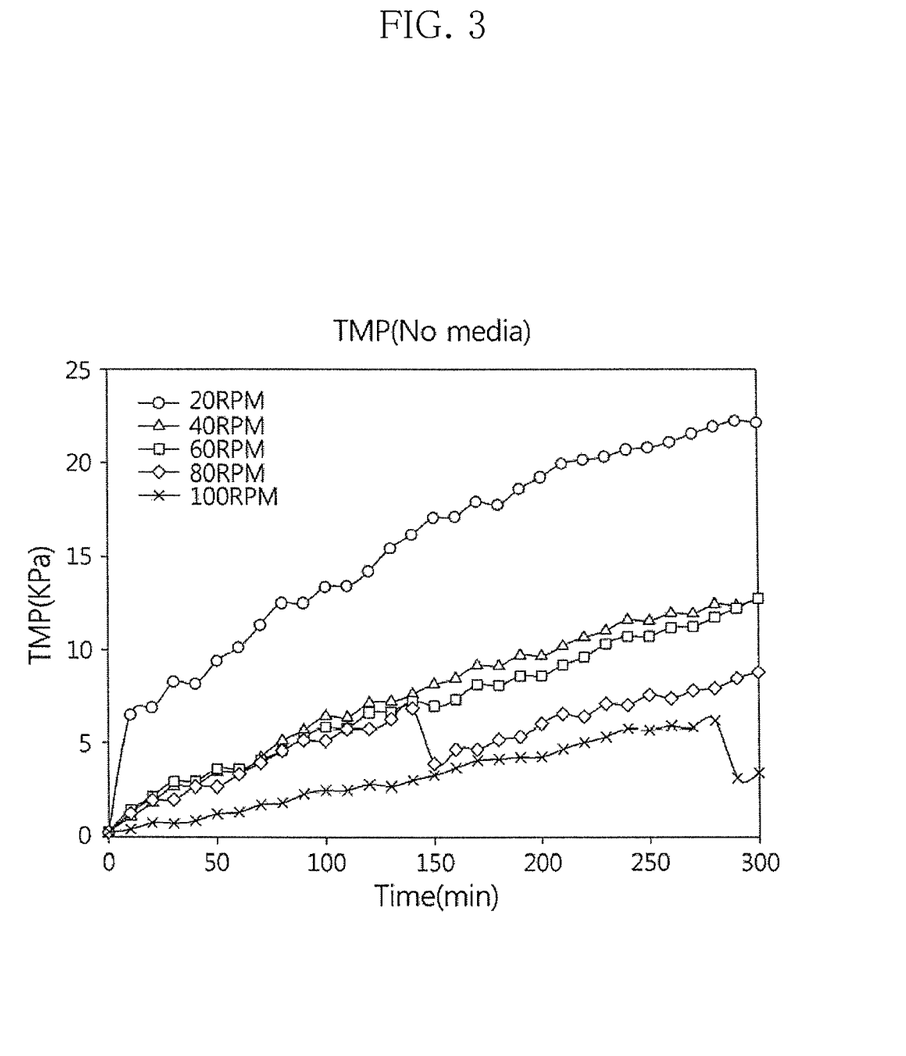
FIG. 3 shows the change of transmembrane pressure according to a rotating speed of a rotating disk without applying a second media.
Figure 4:
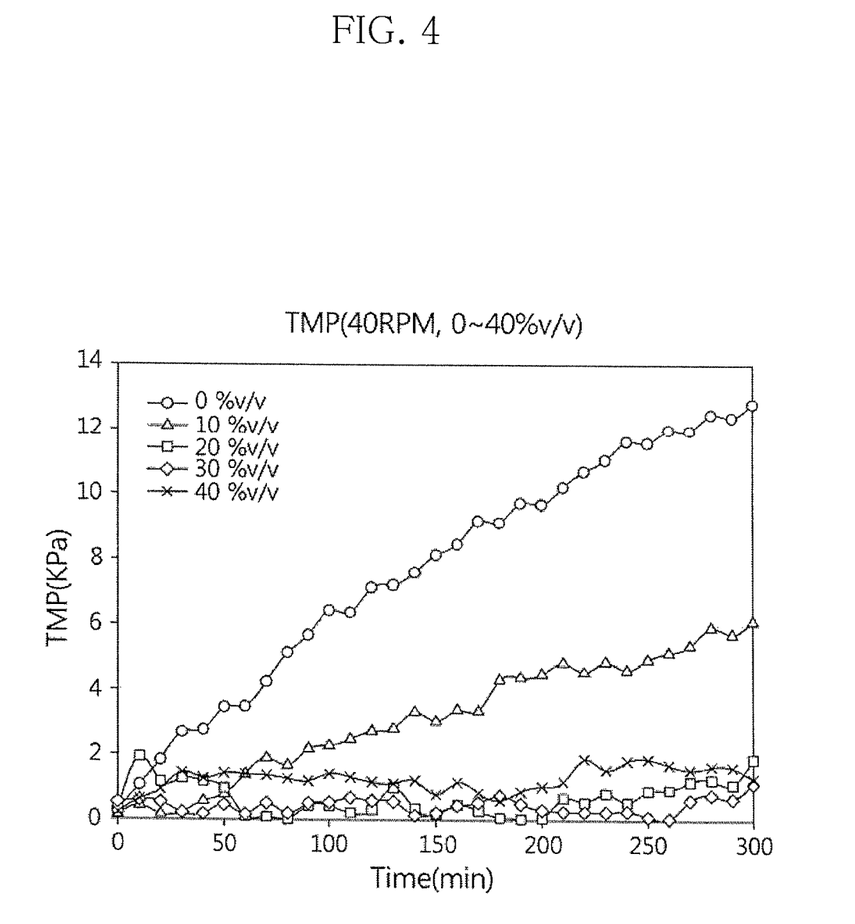
FIG. 4 shows the change of transmembrane pressure according to an amount of input second media (v/v) when the rotating disk rotates at a rotating speed of 40 rpm.

FIG. 3 shows the change of transmembrane pressure according to a rotating speed of the rotating disk without applying a second media, and FIG. 4 shows the change of transmembrane pressure when an amount of input second media (v/v) is adjusted to 0 to 40% v/v in a state where the rotating speed of the rotating disk is fixed to 40 rpm.

Referring to FIG. 4, in the case the amount of input second media is 0% v/v when the rotating speed of the rotating disk is 40 rpm, in other words in the case media are provided by 10 to 40% v/v in comparison to the case where no media is provided, it may be found that the transmembrane pressure is maintained in a very low level. This reveals that the provided media play an important role for reducing fouling of the membrane modules.

While the exemplary embodiments have been shown and described, it will be understood by those skilled in the art that various changes in form and details may be made thereto without departing from the spirit and scope of the present disclosure as defined by the appended claims.

What is claimed is:

1. An apparatus for anaerobic wastewater treatment with a membrane, comprising:
    an anaerobic reactor for performing anaerobic treatment to wastewater and generating biogas;
    an anaerobic membrane bio-reactor for filtering wastewater discharged from the anaerobic reactor by means of a membrane module and providing an additional anaerobic treatment space for the wastewater;
    an submerged membrane module provided in the anaerobic membrane bio-reactor to filter wastewater;
    rotating disks provided at both sides of the submerged membrane module to induce turbulence to the wastewater by means of rotation; and
    second media provided in the anaerobic membrane bio-reactor to circulate according to the flow of the wastewater so that foulants on a surface of the membrane module are detached.

2. The apparatus for anaerobic wastewater treatment with a membrane according to claim 1,
    wherein a plurality of first media are provided in the anaerobic reactor, and anaerobes are attached to surfaces of the first media and the second media.

3. The apparatus for anaerobic wastewater treatment with a membrane according to claim 1,
    wherein the anaerobic reactor is operated to make down flow.

4. The apparatus for anaerobic wastewater treatment with a membrane according to claim 1,
    wherein, when the anaerobic reactor is operating, wastewater is circulated so that the volume of the first media is expanded by 20 to 30%.

5. The apparatus for anaerobic wastewater treatment with a membrane according to claim 1,
    wherein an anaerobic granular sludge or sludge blanket is provided in the anaerobic reactor, and the anaerobic reactor is operated to make up flow.

6. The apparatus for anaerobic wastewater treatment with a membrane according to claim 1,
    wherein an anaerobic suspended sludge is provided in the anaerobic reactor, and a stirrer is provided in the anaerobic reactor for mixing.

7. The apparatus for anaerobic wastewater treatment with a membrane according to claim 2,
    wherein the first media or the second media is made of organic polymer material with a porous surface, and
    wherein the media have a hexahedral or spherical shape made of any one of polyurethane, polypropylene and polyethylene, or have a spherical shape made by uniting fiber bundles made of any one of polyurethane, polypropylene and polyethylene.

8. The apparatus for anaerobic wastewater treatment with a membrane according to claim 1,
    wherein a plurality of rotating disks are provided to be spaced apart from each other, and a membrane module is provided in a space respectively between the rotating disks.

9. A method for anaerobic wastewater treatment with a membrane, comprising:
    introducing wastewater into an anaerobic reactor provided with anaerobes to perform anaerobic treatment and generate biogas;
    supplying wastewater discharged from the anaerobic reactor into an anaerobic membrane bio-reactor provided with an submerged membrane module and second media; and
    filtering wastewater by the submerged membrane module, and additionally performing anaerobic treatment to the wastewater and generating biogas in the anaerobic membrane bio-reactor,
    wherein the method further comprises a foulant removing operation for rotating rotating disks provided at both sides of the submerged membrane module to make turbulence to the wastewater so that foulants on a surface of the membrane module are removed through the second media, and wherein the foulant removing operation is applied during said filtering of wastewater.

10. The method for anaerobic wastewater treatment with a membrane according to claim 9, wherein first media is provided in the anaerobic reactor, wastewater is supplied into the anaerobic reactor as down flow, and wastewater is circulated so that the volume of the first media is expanded by 20 to 30%.

11. The method for anaerobic wastewater treatment with a membrane according to claim 9, wherein anaerobic granular sludge or sludge blanket is provided in the anaerobic reactor, and the anaerobic reactor is operated to make up flow.

12. The method for anaerobic wastewater treatment with a membrane according to claim 9, wherein anaerobic suspended sludge is provided in the anaerobic reactor, and a stirrer is provided in the anaerobic reactor for mixing so that the anaerobic reactor is operated as a complete mixing reactor.

13. The method for anaerobic wastewater treatment with a membrane according to claim 9, wherein, the biogas produced by the anaerobic treatment performed to the wastewater and the additionally performed anaerobic treatment to the wastewater is exhausted and stored in a biogas tank.

* * * * *